US006950294B2

(12) United States Patent
Ammann

(10) Patent No.: US 6,950,294 B2
(45) Date of Patent: Sep. 27, 2005

(54) SURGE PROTECTION FILTER AND LIGHTNING CONDUCTOR SYSTEM

(75) Inventor: Bruno Ammann, Goldach (CH)

(73) Assignee: Huber & Suhner AG, Herisau (SE)

(*) Notice: Subject to any disclaimer, the term of this patent is extended or adjusted under 35 U.S.C. 154(b) by 242 days.

(21) Appl. No.: 10/399,187

(22) PCT Filed: Oct. 15, 2001

(86) PCT No.: PCT/CH01/00617

§ 371 (c)(1), (2), (4) Date: Aug. 11, 2003

(87) PCT Pub. No.: WO02/35659

PCT Pub. Date: May 2, 2002

(65) Prior Publication Data

US 2004/0100751 A1 May 27, 2004

(30) Foreign Application Priority Data

Oct. 25, 2000 (CH) ............................................ 208900

(51) Int. Cl.[7] ............................................ H02H 9/06
(52) U.S. Cl. ............................................ 361/119
(58) Field of Search ................................ 361/119, 111, 361/120; 333/12, 24 R, 26; 340/425

(56) References Cited

U.S. PATENT DOCUMENTS

| | | | | |
|---|---|---|---|---|
| 5,053,910 A | * 10/1991 | Goldstein | .................. | 361/111 |
| 5,764,114 A | * 6/1998 | Kuhne | .................. | 333/12 |
| 6,101,080 A | * 8/2000 | Kuhne | .................. | 361/119 |
| 6,785,110 B2 | * 8/2004 | Bartel et al. | .................. | 361/119 |
| 2004/0169986 A1 | * 9/2004 | Kauffman | .................. | 361/119 |

FOREIGN PATENT DOCUMENTS

| | | | |
|---|---|---|---|
| DE | 19520974 A1 | * 12/1996 | ............ H02H/7/26 |
| EP | 938166 A1 | * 8/1999 | ........... H01P/1/202 |
| EP | 962188 A1 | * 12/1999 | ............ A61B/5/16 |

* cited by examiner

*Primary Examiner*—Brian Sircus
*Assistant Examiner*—Boris Benenson
(74) *Attorney, Agent, or Firm*—Notaro & Michalos PC

(57) ABSTRACT

The system (1) is installed in a coaxial line for the transmission of high-frequency signals. It serves for the purpose of protecting apparatus or installations against electromagnetic pulses, overvoltages and/or lightning strokes. The system (1) comprises shortcircuit lines (5, 6), which are disposed approximately parallel to the inner conductor (3) of the coaxial line. This disposition makes possible to develop the housing (2) of the system (1) concentrically to the longitudinal axis (9) and the housing (2) has no projecting elements.

11 Claims, 6 Drawing Sheets

SURGE PROTECTION FILTER AND LIGHTNING CONDUCTOR SYSTEM

Figure 1:
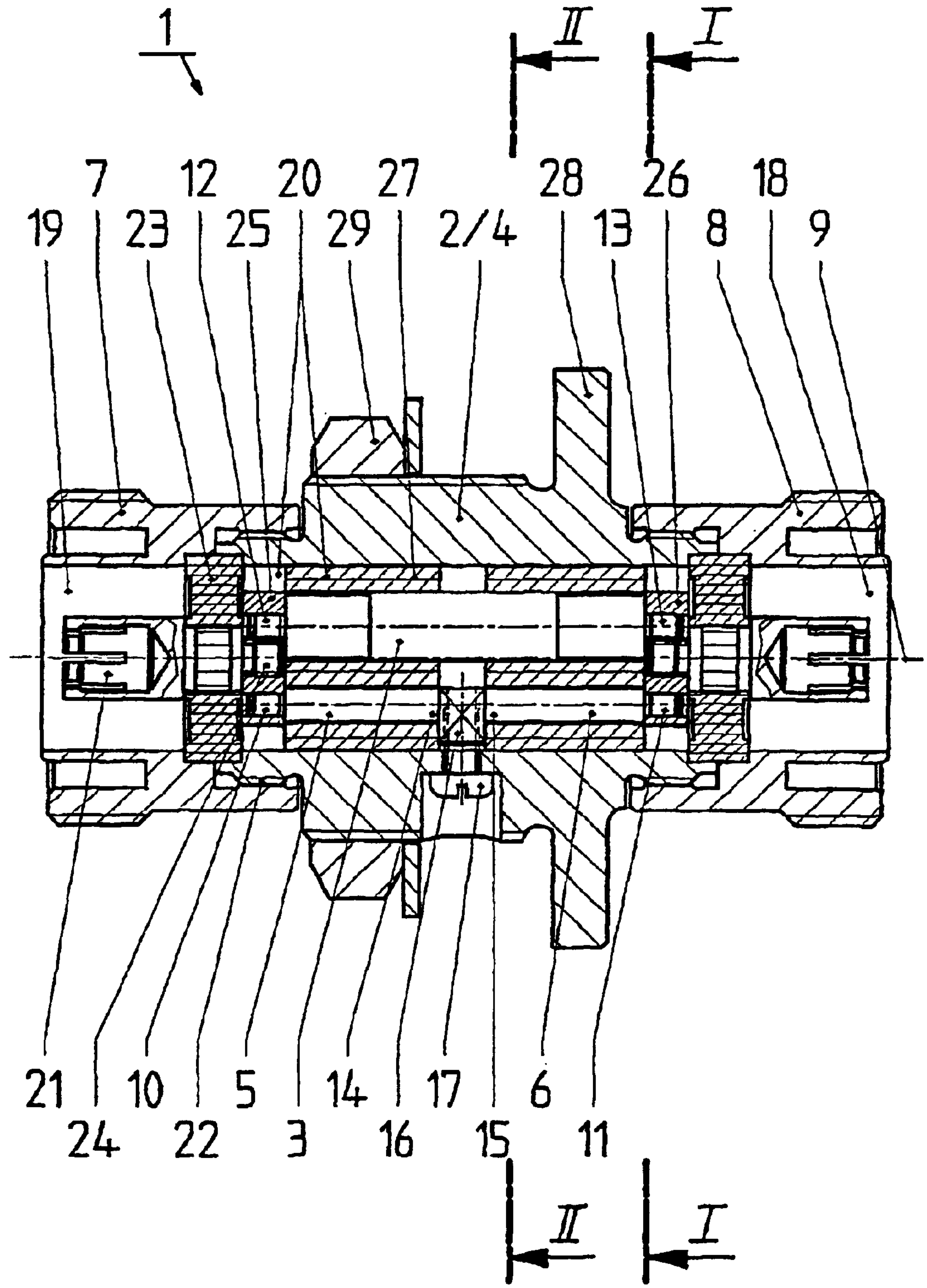

The invention relates to a surge protection filter and lightning arrester system in a coaxial line for transmitting high-frequency signals, comprising a housing with two connectors, with the housing forming an outer conductor at ground potential, an inner conductor guided through the housing and a shortcircuit connection between inner conductor and housing.

Surge protection filter and lightning arrester systems of this type are known. They serve for the protection of modules, apparatus or installations, which are connected to lines, for example coaxial lines of telecommunication devices, against electromagnetic pulses, overvoltages and/or lightning currents. Electromagnetic pulses of an artificial type can be generated for example by motors, switches, clocked power supplies or also in connection with nuclear events, and pulses of natural origin can be generated for example as a consequence of direct or indirect lightning strokes. The known protection circuits are disposed at the input side of the modules, apparatus or installation, with these being either discharging or reflecting systems.

An EMP arrester of this type is known from EP 938 166. This EMP arrester comprises a housing serving as outer conductor and connected to ground potential. In a first portion of this housing, extending in the direction of the introduction axis of a coaxial cable, is guided an inner conductor. In a second housing portion, which projects at right angles from the first housing portion, is disposed a λ/4 shortcircuit conductor, which connects the inner conductor with the housing. With this known T-configuration with suitable known geometric configurations and implementations, very good protection of the connected apparatus, modules or installations can be attained. EMP arresters of this type must meet international standards and fulfill for example the test conditions according to the IEC standard. In spite of the good effectiveness per se, arresters of this type have the disadvantage that a residual pulse, and thus also a residual energy, is released via the inner conductor to the connected modules, apparatus or installations. A further disadvantage comprises that the housing portion, disposed at right angles to the inner conductor accommodating the λ/4 arresters, is relatively large and leads to a bulky size of these arresters. The installation of such arresters often presents considerable difficulties due to the right-angle projection of the λ/4 structural component, and it is also necessary to maintain corresponding spacings between adjacent structural elements. This structure can also not be covered against environmental effects with a shrink tube but rather, in practice, are enwrapped with corrosion protection tape. This generates further costs.

The present invention therefore addresses the problem of providing a surge protection filter and lightning arrester system in which the remaining residual pulses and residual energies are additionally reduced, the housing does not have any additional structural component projecting at right angles, and the entire system is to be developed compactly and largely axially symmetric.

This problem is solved through the characteristics defined in the characterizing part of patent claim 1. Advantageous further developments of the invention are evident based on the characteristics of the dependent patent claims.

In the solution, or the system, according to the invention the longitudinal axis of the inner conductor and the longitudinal axis of the shortcircuit connection between the inner conductor and the housing are disposed approximately parallel. The longitudinal axes of the inner conductors and the shortcircuit connection extend simultaneously approximately parallel to the longitudinal axis of the system or of the housing. All essential structural elements of the system are disposed about the longitudinal axis of the housing such that the housing can be developed concentrically with the longitudinal axis. This disposition leads to a compact cylindrical implementation of the system, in which the input and output for the cables, or the corresponding connectors, are on the same axis and this coincides with the longitudinal axis of the system. The disposition of two shortcircuit lines directed toward one another, which form the shortcircuit connection between inner conductor and outer conductor, yields further advantages. If surge pulses, which are generated by a lightning stroke or another electromagnetic event, are arrested across the two shortcircuit lines directed opposing one another to ground, the voltages generated therein are partially cancelled through the induction effect. The consequence is that the residual pulses and the residual energies, which occur at the output of the system, are considerably reduced. Comparison measurements compared to a traditional system with λ/4 arrester projecting at right angles for the same power range, show that in the solution according to the invention the residual voltage pulse can be reduced for example by the factor 4 and the residual energy for example by the factor 30. These factors can vary within a wide range depending on the structural form and material selection of the individual structural elements, however, in every case a considerable decrease of the residual pulse and of the residual energy occurs.

Further advantages of the solution according to the invention result therefrom that the two shortcircuit lines do not have the length of normal λ/4 arresters, but rather, through the disposition and the implementation of the connection regions between the inner conductor and the two shortcircuit lines at the outer ends, the geometric length of the shortcircuit lines can be shortened. So-called electrically lengthened λ/4 shortcircuit lines are formed. In an equivalent circuit diagram each shortcircuit line has a capacitance and an inductance, which act in parallel. Through this implementation a broadband range of effectiveness of the apparatus results, for example for high-frequency signals in the range of 1.7 to 2.5 GHz. Adaptation to other frequency ranges is possible in a manner known per se within a wide range by changing the capacitance and the inductance on the inner conductor and on the shortcircuit lines. By installing an additional highpass filter in the inner conductor, and specifically at the connection side to the apparatus part, the already considerably reduced residual energies can be decreased still further. The considerable reduction of the residual pulse through the solution according to the invention makes it possible to dispense with fine trimming protection circuits such as are necessary with other known solutions.

The solution according to the invention additionally makes possible for the compact and concentric structural form the installation of additional pulse-arresting elements between the opposingly directed ends of the shortcircuit lines and the housing. As additional pulse-arresting elements can be employed for example gas discharge arresters or varistors or diodes, with these elements being decoupled in the operating frequency range of the system. This disposition permits the transmission of feed voltages. The system can consequently also be applied for the RF decoupling of corresponding additional pulse-arresting elements without the intermodulation behaviour being degraded.

Figure 2:
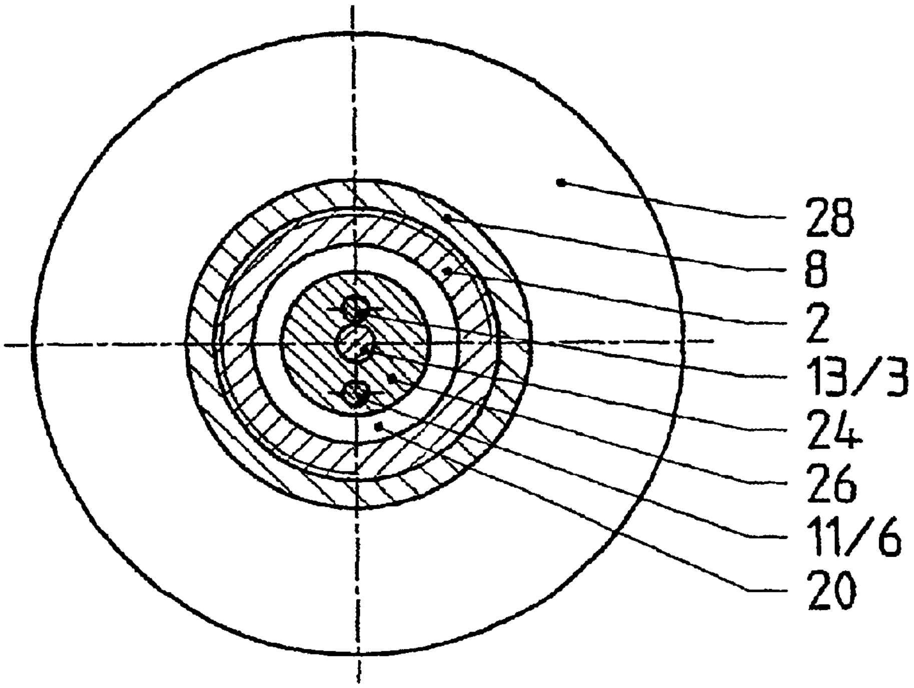
Figure 3:
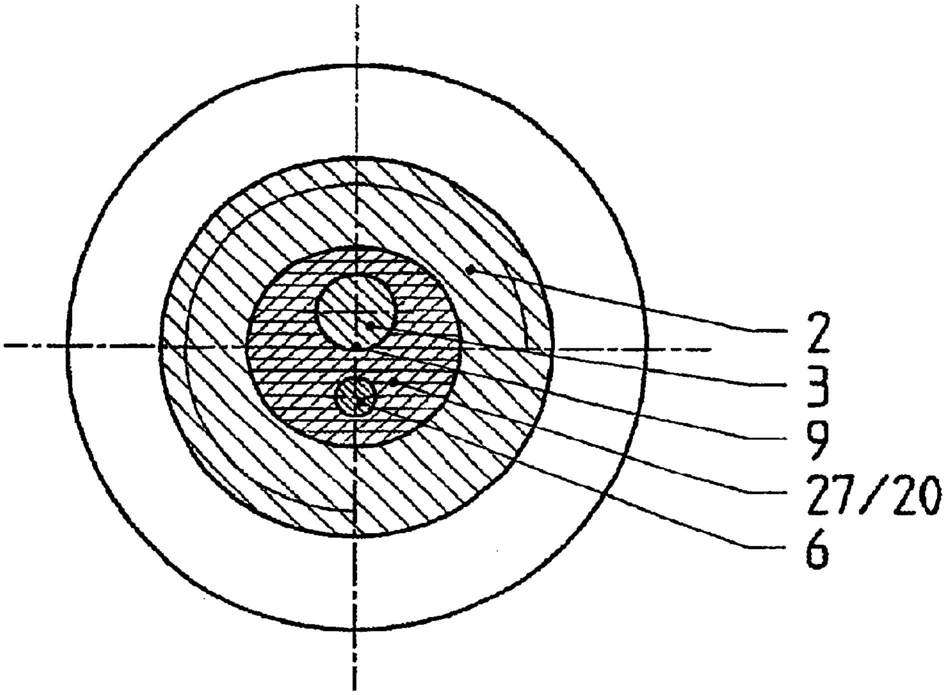
Figure 4:
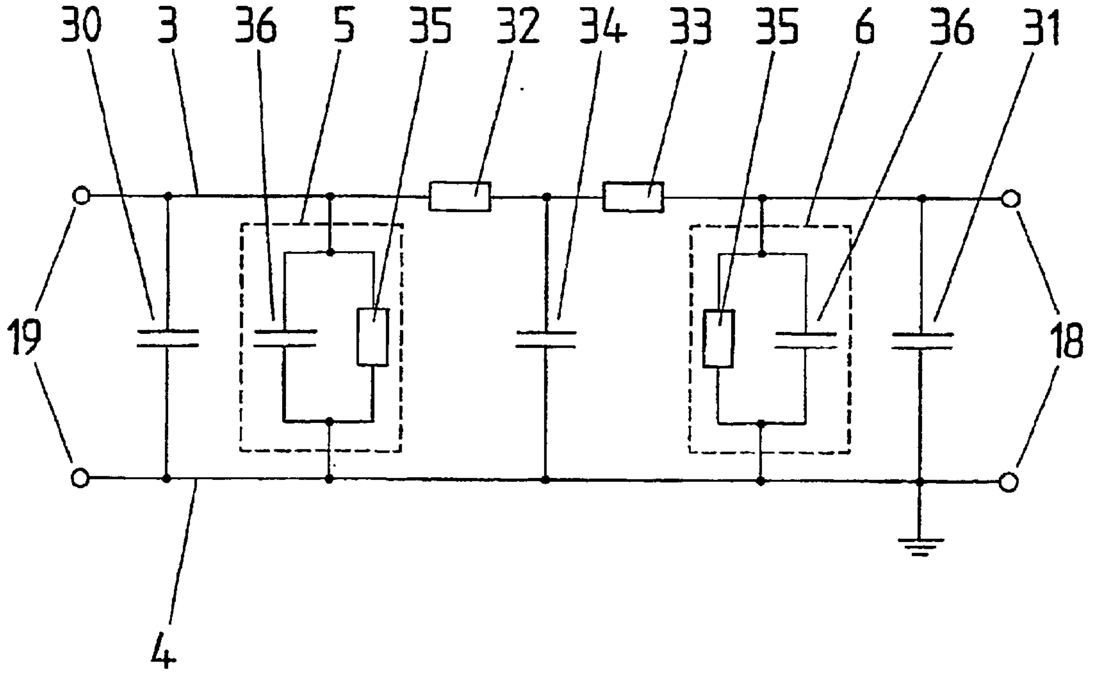
Figure 5:
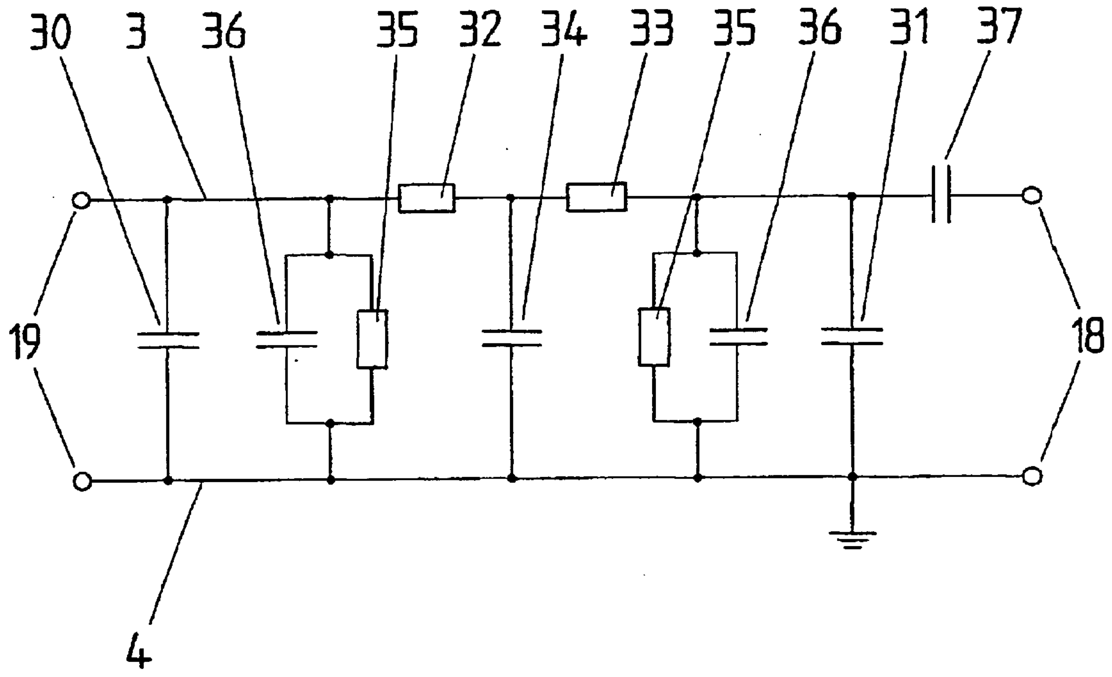
Figure 6:
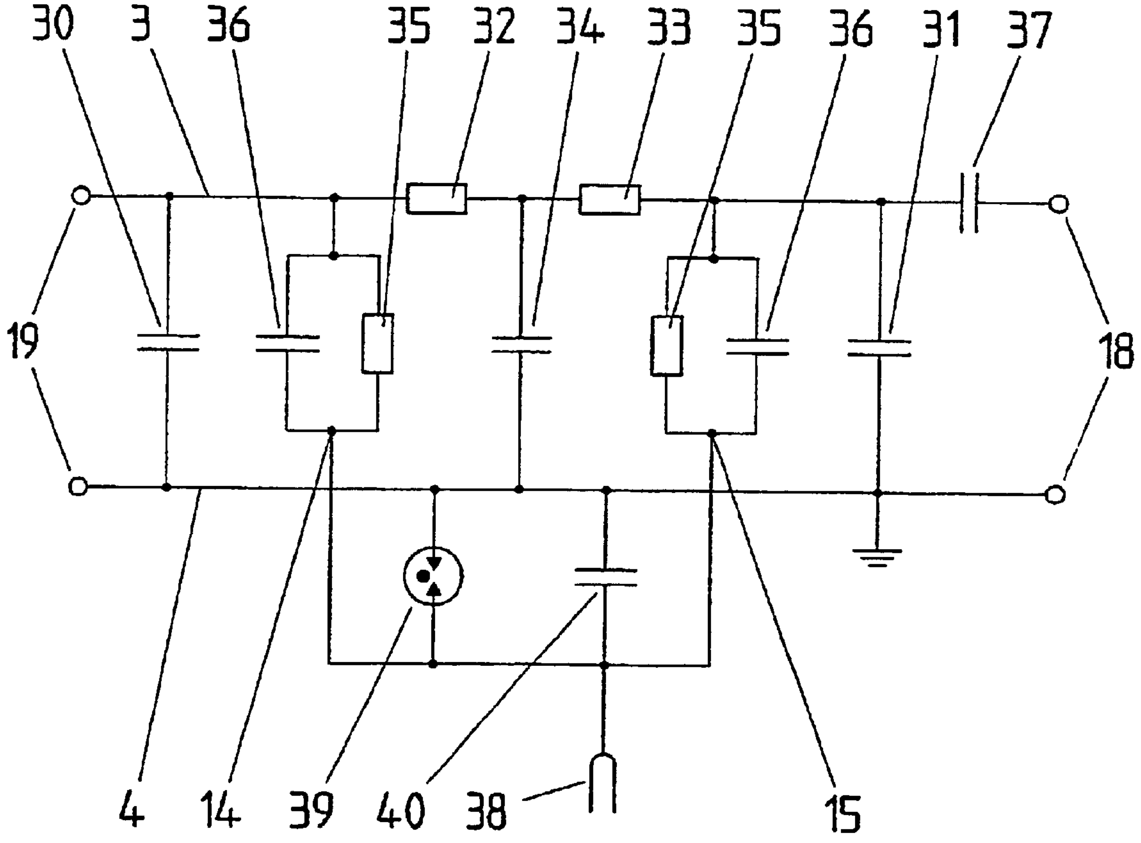

In the following the invention will be explained in further detail in conjunction with embodiment examples with reference to the enclosed drawing. Therein depict:

FIG. 1 a longitudinal section through a system according to the invention,

FIG. 2 a cross section along line I—I in FIG. 1,

FIG. 3 a cross section along line II—II in FIG. 1,

FIG. 4 an equivalent circuit diagram for the system according to FIG. 1,

FIG. 5 an equivalent circuit diagram for a system according to FIG. 1 with an additional highpass filter, and FIG. 6 an equivalent circuit diagram for a system according to FIG. 1 with an additional highpass filter and an additional arresting element and a DC feed-in.

FIG. 1 depicts a longitudinal section through a surge protection filter and lightning current arrester system 1 with bilateral connectors 7, 8 for coaxial cables. The coaxial cable is not shown and serves for example as connection between an antenna and a transmission receiving installation with corresponding apparatus. The connectors 7, 8 known per se, are partially standardized structural elements and comprise at the input side 19 as well as at the output side 18 connection elements to connect, on the one hand, the inner conductor of the cable via elements 21 with the inner conductor 3 of system 1 and, on the other hand, the outer conductor of the cable via a mechanical connection 22 with the housing 2. The housing 2 forms therein the outer conductor 4 of the system 1. The connection elements 21 are both disposed on the longitudinal axis 9 of the system 1 or the housing 2, and are stayed via insulator disks 23 in housing 2. An inner portion 24 of the connection elements 21 are connected such that they are electrically conducting for example by screw-connection, soldering or crimping, with one disk 25, 26 each. These disks 25, 26 are formed of an electrically conducting material, in particular metal, for example of brass. These two disks 25, 26 are disposed in the direction of the longitudinal axis 9 of housing 2 spaced apart and form connection sites 12, 13 between the inner conductor 3 and two shortcircuit conductors 5, 6. The inner conductor 3 is disposed parallel to the longitudinal axis 9 of the housing 2 and spaced apart from it. In the depicted example the entire inner conductor of system 1 comprises the connection elements 21, portions of disks 25, 26 as well as the inner conductor 3. The inner conductor comprises over its length different geometric variations, whereby different reactance values, or inductances and capacitances are formed. The two shortcircuit conductors 5, 6 are also disposed approximately parallel to the longitudinal axis 9 of housing 2 and spaced apart from it. The outer ends 10, 11 of these two shortcircuit conductors 5, 6 are connected via the disks 25 and 26 with the inner conductor 3 and with connection elements 21. The inner ends 14, 15 of the two shortcircuit conductors 5, 6 are directed opposing one another and connected such that they are electrically conducting across a contact part 16 with the housing 2. In the depicted example the two shortcircuit conductors 5 and 6 and the contact part 16 are developed integrally. The two shortcircuit conductors 5, 6 and the associated parts of disks 25, 26 form the shortcircuit connection between the inner conductor 3 and the housing 2. In a manner known per se, by adapting the geometric dimensions of these elements and the choice of the dielectric 20, the frequency range and the bandwidth for the intended application field of the system can be determined. To improve the electric properties the inner conductor 3 and the shortcircuit conductors 5, 6 are at least partially encompassed by an insulating body 27. In subregions between housing 2 and inner conductor 3, or the shortcircuit conductors 5, 6 and the disks 25, 26, air is present as the dielectric. Housing 2 is equipped with a flange 28 and a screw connection 29 to plug it for example via a leadthrough into an electrically conducting apparatus wall and to fasten it. The arresting of the pulses subsequently takes place via this electrically conducting apparatus wall toward the potential equalization.

In FIG. 2 a cross section through the system 1 along line I—I in FIG. 1 is depicted. Disk 26 is evident, into which centrally the inner portion 24 of the connection element 21 is inserted and connected with it. Displaced outwardly, the outer end 11 of shortcircuit conductor 6 and the region 13 of the inner conductor 3 is also connected with disk 26. The disk 26 is concentrically encompassed by housing 2 and between disk 26 and housing 2 is disposed the dielectric 20, which in this region is air.

FIG. 3 shows a further cross section through system 1 and specifically along line II—II in FIG. 1. The inner conductor 3 and the shortcircuit conductor 6 are evident, which extend approximately parallel to one another and parallel to the longitudinal axis 9. The inner conductor 3 as well as the shortcircuit conductor 5, 6 are embedded in the dielectric 20, which in this region is formed by the insulation body 27 and is comprised for example of the material Teflon.

The surge protection filter and lightning current arrester system, such as is depicted and described by example in FIGS. 1 to 3, has compact and minimum structural dimensions. It permits high packing density of the lines, and no projecting structural parts are necessary. Housing 2, and consequently the entire system 1, can be developed in the form of a cylinder and can consequently be inserted into round bores and no position orientation needs to be observed. Line introductions disposed one next to the other, can be disposed closely without the elements of the individual systems 1 interfering with one another or damage occurring. This structural form can be protected in simple manner against environmental effects with a shrink tube. The system 1 according to the invention has simultaneously substantially reduced residual pulses and residual energies. If the surge protection filter and lightning current arrester system 1 according to the invention is subjected to a standard surge current with a wave form 8/20 $\mu$s, a voltage residual pulse of approximately 16 V and approximately 13 $\mu$J at 25 kA remains for example. If a conventional system with a $\lambda/4$ shortcircuit conductor, projecting at right angles, for the same frequency band is subjected to the same test, this conventional system has a voltage residual pulse of 70 V and approximately 430 $\mu$J at 25 kA. Simultaneously the system 1 according to the invention and represented as example, is layed out broadband for a frequency range of 1.7 to 2.5 GHz. This broadband layout is applicable in the entire application range of approximately 400 MHz up to the upper limit frequency of the plug connector. The outer diameter of housing 2 in the depicted example is with these plug connectors 29 mm and the total length of system 1 via these connection elements 21 is approximately 72 mm. Depending on the application range and the plug connectors or the high-frequency range to be transmitted the dimensions vary correspondingly.

FIG. 4 depicts an equivalent circuit diagram of the technical high-frequency system 1 according to FIG. 1. Between the input side 19 and the output side 18 extend the inner conductor 3 and the outer conductor 4. The input or the output side 19, 18 is defined according to the direction of the pulse, i.e. the input side 19 is for example directed toward the antenna and the output side 18 toward the apparatus to be protected. The main path formed by the inner conductor 3 comprises a capacitor 30, an inductor 32, a capacitor 34, an inductor 33 and a further capacitor 31. These have different reactance values. The shortcircuit conductors 5, 6 in the equivalent circuit diagram are each represented by one inductor 35 and one parallel connected capacitor 36. The outer conductor 4, or the housing 2, is connected to ground potential.

In FIG. 5 is shown the same equivalent circuit diagram as in FIG. 4, however, additionally in front of output 18 of the main strand or of the inner conductor 3, a capacitor 37 is formed. This capacitor 37 forms in a manner known per se a highpass filter and serves for the purpose of still further reducing the residual energies.

FIG. 6 shows an equivalent circuit diagram for a system 1 according to the invention, in which a DC current feed-in 38 is provided. In addition to the equivalent elements described in connection with FIGS. 4 and 5, this configuration comprises an additional pulse-arresting element 39 and a further capacitor 40. As the additional pulse-arresting element 39 can be applied a gas discharge arrester, a varistor or a diode. This arresting element 39 is interconnected between the output side 14, 15 of the shortcircuit conductors 5 and 6 and the outer conductor 4, or the housing 2. This additional arrester device 39 is decoupled in the transmittable frequency range.

In FIGS. 4 to 6 discrete equivalent components depicted in the equivalent circuit diagrams can be available in actuality or are realized through different line lengths and impedances, such as is depicted in the example according to FIG. 1.

What is claimed is:

1. Surge protection filter and lightning current arrester system (1) in a coaxial line for the transmission of high-frequency signals, comprising a housing (2) with two connectors (7, 8), with the housing (2) forming an outer connector (4) connected to ground potential, an inner conductor (3) guided through the housing (2) and a shortcircuit connection (5, 6) between inner conductor (3) and housing (2), characterized in that the shortcircuit connection is comprised of two shortcircuit lines (5, 6), which are disposed approximately parallel to the inner conductor (3), one end each (10, 11) of these two shortcircuit lines (5, 6) on two regions (12, 13) spaced from each other, being connected to the inner conductor (3) and the two other ends (14, 15) of the two shortcircuit lines (5, 6) are directed opposing one another and are connected across connection elements (16, 17) to the housing (2).

2. Surge protection filter and lightning current arrester system 1 as claimed in claim 1, characterized in that each shortcircuit line (5, 6) comprises a capacitor (36) and an inductor (35), which form a parallel oscillating circuit.

3. Surge protection filter and lightning current arrester system as claimed in claim 1, characterized in that in the region of the two connection sites (12, 13) between the inner conductor (3) and the shortcircuit conductors (5, 6), on the inner conductor (3) one capacitor (30, 31) each is developed and the inner conductor (3) between the two connection sites (12, 13) comprises a further capacitor (34) and at least one inductor (32, 33).

4. Surge protection filter and lightning current arrester system as claimed in claim 1, characterized in that on the output side (18) on the inner conductor (3) a highpass filter (37) is disposed.

5. Surge protection filter and lightning current arrester system as claimed in claim 1, characterized in that between the opposingly directed ends (14, 15) of the shortcircuit lines (5, 6) and the housing (2) a capacitor (40) is interconnected and parallel to it an additional pulse-arresting element (39).

6. Surge protection filter and lightning current arrester system as claimed in claim 1, characterized in that between the inner conductor (3), on the one hand, and the shortcircuit conductors (5, 6) as well as the housing (2) on the other hand, a dielectric (20) is disposed.

7. Surge protection filter and lightning current arrester system as claimed in claim 1, characterized in that with the exception of the connection elements (16, 17) between the shortcircuit conductors (5, 6) and the housing (2) all effective structural elements are disposed concentrically to the longitudinal axis (9) of the system (1) or parallel to the longitudinal axis (9) of the system (1).

8. Surge protection filter and lightning current arrester system as claimed in claim 1, characterized in that the shortcircuit lines (5, 6) are electrically lengthened $\lambda/4$ shortcircuit lines.

9. Surge protection filter and lightning current arrester system as claimed in claim 1, characterized in that the different line sections of the shortcircuit conductors (5, 6) and of the connection elements (25, 26) determine the bandwidth and the frequency range of the HF transmission.

10. Surge protection filter and lightning current arrester system as claimed in claim 1, characterized in that the different line sections of the inner conductor (3) and the dielectric (20) determine the characteristic over the bandwidth of the IF transmission.

11. Surge protection filter and lightning current arrester system as claimed in claim 5, characterized in that the pulse-arresting element (39) is a gas discharge arrester or a varistor or a diode and across this pulse-arresting element (39) and the capacitor (40) is disposed a DC current feed-in.

* * * * *